(No Model.)
R. H. F. BEHRENS.
FLOWER STAND.
No. 318,853. Patented May 26, 1885.
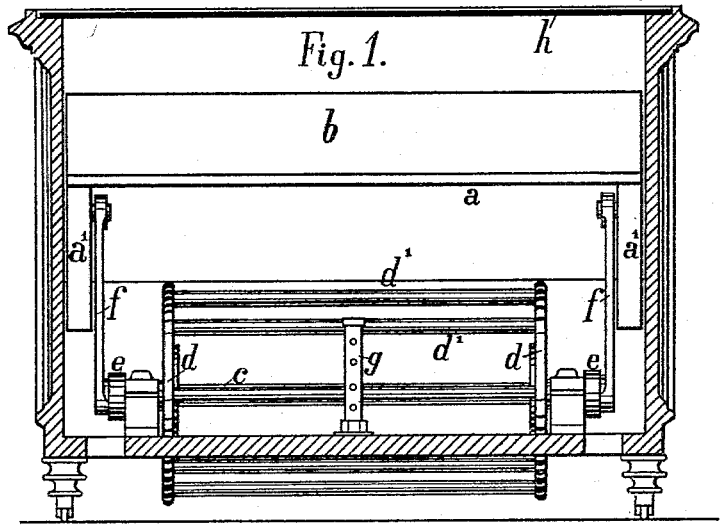
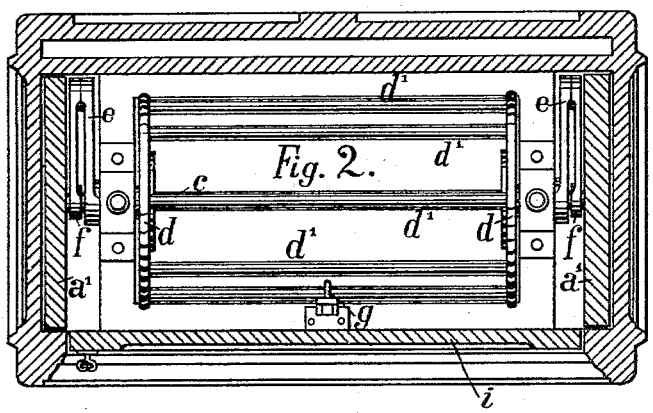
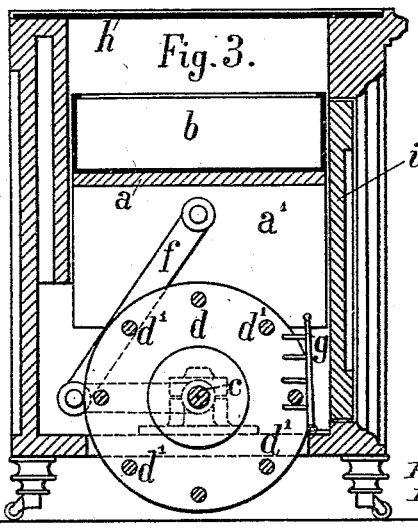
Witnesses,
C. J. Belt
Oscar Nauck.
Inventor,
Robert H. F. Behrens,
By Paine & Dodd.
Att'ys.

UNITED STATES PATENT OFFICE.

ROBERT HEINRICH FERDINAND BEHRENS, OF HAMBURG, GERMANY.

FLOWER-STAND.

SPECIFICATION forming part of Letters Patent No. 318,853, dated May 26, 1885.

Application filed February 15, 1884. (No model.)

*To all whom it may concern:*

Be it known that I, ROBERT HEINRICH FERDINAND BEHRENS, a subject of the German Emperor, and a resident of Hamburg, in the German Empire, have invented certain new and useful Improvements in Flower-Stands, of which the following is a specification.

My invention relates to improvements in flower-stands wherein flower-pots are placed for decorating purposes; and the object of my improvements is to provide such flower-stands with a movable bottom, the position of which may be altered according to the size of the flower-pots and the height of the flowers. I attain this object by the mechanism illustrated in the accompanying drawings, in which—

Figures 1, 2, and 3 show a flower-stand the bottom of which can be raised or lowered, Fig. 1 being a front view, Fig. 2 a top view, and Fig. 3 a side elevation, all partly in section.

Similar letters refer to similar parts throughout the several views.

In the flower-stand illustrated the box $b$, wherein the flower-pots are to be placed, is supported by a plate, $a$, sliding up and down inside the chest-like flower-stand. The reel $d$, composed of two disks held apart by means of concentrically-arranged rods $d'$, the shaft $c$ of which is provided with levers $e$, is pivoted beyond the plate $a$. To the extremity of each lever $e$ is attached a rod, $f$, which is connected with the plate $a$ directly or with the guides $a'$ of such plate. The combination of levers at both sides of the reel $d$ causes the plate $a$ to be raised or lowered by every rotary motion of the reel. The lever $g$, the fingers of which engage into the rods $d'$ of the reel, serves to keep the latter in any position required. When no flowers are in the box $b$, the flower-stand may be covered by a plate, $h$, of marble, wood, or other suitable material.

In order that the reel $d$, which is placed inside the stand, may be conveniently operated from outside, I provide a door, $i$, in the side of the said stand, so that when the door is opened the lever $g$ can be turned backward on its hinge out of contact with the bar $d'$. The reel can then be rotated by pressing upon the bars $d'$ in either direction, and when the plate $a$ is at the desired elevation the lever $g$ can be turned forward and the reel secured.

Having thus fully described my invention, what I desire to claim and secure by Letters Patent is—

1. In flower-stands, the combination of the plate $a$, with the reel $d$, shaft $c$, levers $e$, connecting-rods $f$, and means for locking said reel, substantially as set forth.

2. In flower-stands, the combination of the plate $a$, the guides $a'$, the connecting-rods $f$, the levers $e$, the reel $d$, provided with rods $d'$ and mounted upon the lever-shaft $c$, and the hinged lever $g$, substantially as and for the purpose set forth.

In testimony that I claim the foregoing as my invention I have signed my name, in presence of two witnesses, this 14th day of January, 1884.

ROBERT HEINRICH FERDINAND BEHRENS.

Witnesses:
 ALEXANDER SPECHT,
 DIEDRICH PETERSEN.